United States Patent
Dakroub et al.

(10) Patent No.: US 6,898,034 B2
(45) Date of Patent: May 24, 2005

(54) FLY HEIGHT MEASUREMENT FOR A DISC DRIVE

(75) Inventors: Housan Dakroub, Oklahoma City, OK (US); Mukund C. Rao, Oklahoma City, OK (US); Alfredo Gay Sam, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 440 days.

(21) Appl. No.: 10/112,273

(22) Filed: Mar. 27, 2002

(65) Prior Publication Data

US 2003/0067698 A1 Apr. 10, 2003

Related U.S. Application Data

(60) Provisional application No. 60/328,273, filed on Oct. 10, 2001.

(51) Int. Cl.$^7$ .............................. G11B 5/09; G11B 27/36
(52) U.S. Cl. ............................. 360/31; 360/75
(58) Field of Search ..................... 360/31, 75

(56) References Cited

U.S. PATENT DOCUMENTS

| | | | |
|---|---|---|---|
| 4,954,904 A | * 9/1990 | Goor ........................ 360/294.7 |
| 5,377,058 A | * 12/1994 | Good et al. .................... 360/75 |
| 5,638,012 A | * 6/1997 | Hashimoto et al. ......... 327/110 |
| 5,870,250 A | * 2/1999 | Bolasna et al. .......... 360/236.8 |
| 5,995,335 A | 11/1999 | Jurgenson et al. |
| 6,046,596 A | 4/2000 | Schaenzer et al. |
| 6,268,976 B1 | * 7/2001 | Carlson et al. ............... 360/75 |
| 6,271,924 B1 | 8/2001 | Ngoi et al. |
| 6,281,676 B1 | 8/2001 | Ottesen et al. |
| 6,312,210 B1 | 11/2001 | Lang |
| 6,317,814 B1 | 11/2001 | Blendermann et al. |
| 2001/0013985 A1 | 8/2001 | Baba et al. |
| 2001/0035960 A1 | 11/2001 | Johnston |
| 2001/0046108 A1 | 11/2001 | Lewis et al. |
| 2002/0039244 A1 | * 4/2002 | Wilson ........................ 360/25 |
| 2002/0181153 A1 | * 12/2002 | Kang ..................... 360/236.2 |

* cited by examiner

*Primary Examiner*—David Hudspeth
*Assistant Examiner*—Varsha A. Kapadia
(74) *Attorney, Agent, or Firm*—Fellers, Snider, et al.

(57) ABSTRACT

A method of measuring fly height of a read/write head to form a fly height profile for use in measuring fly height of the read/write head relative to a disc of a disc drive. A fixed source write signal is applied to an inductive element of the read/write head, generating a magnetic flux field with a stray magnetic flux field portion. A magnetoresistive element of the read/write head couples with the magnetic flux field producing an initial field strength signal. As the disc rotates, the read/write head flies there above decreasing the density of the stray magnetic flux field portion thereby decreasing the amplitude of the field strength signal. The decreasing amplitude of the field strength signal is calibrated to a predetermined operating fly height profile to correlate fly height of the read/write head to the decreasing amplitude of the field strength field, which forms the fly height profile.

23 Claims, 3 Drawing Sheets

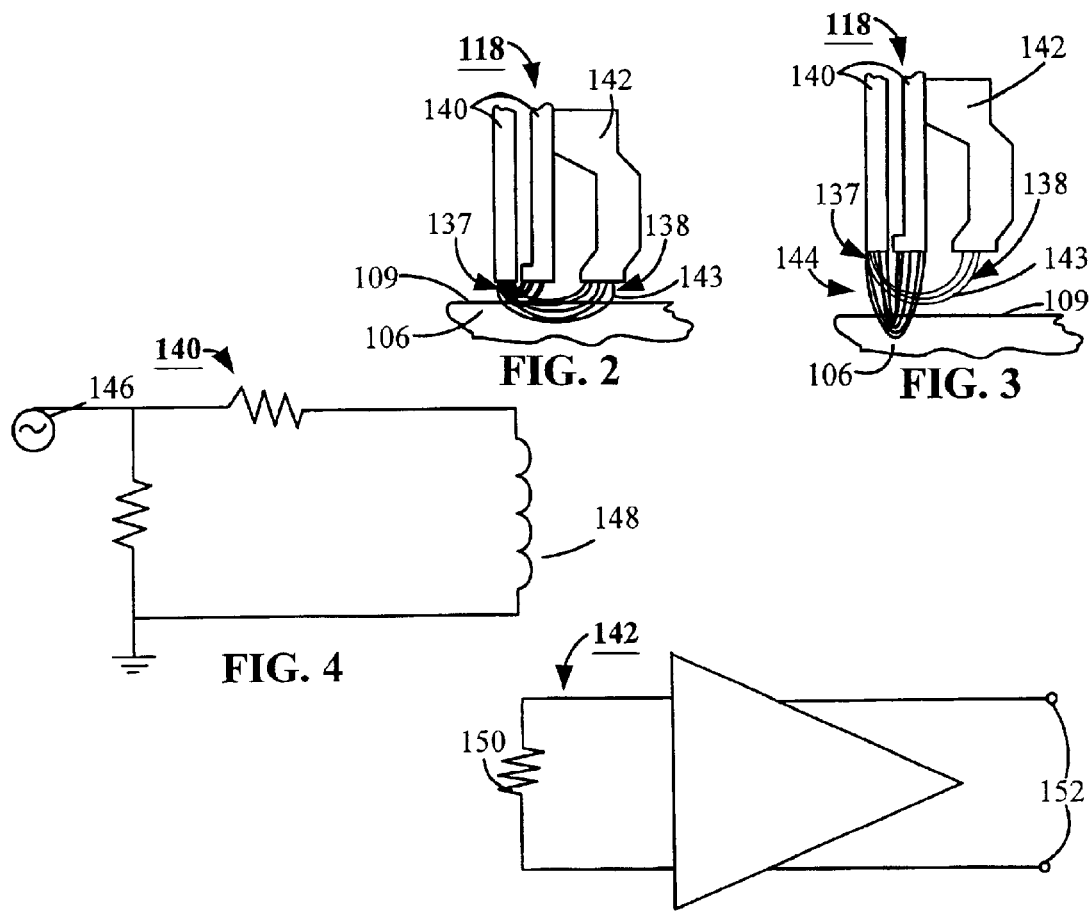
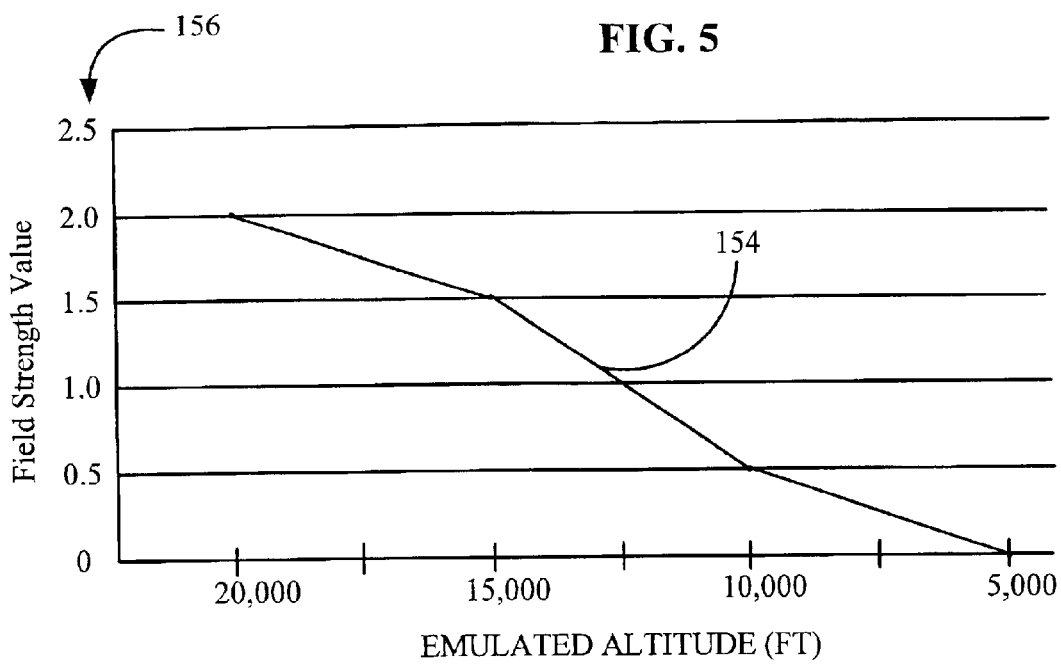

FLY HEIGHT MEASUREMENT FOR A DISC DRIVE

RELATED APPLICATIONS

This application claims priority to U.S. Provisional Application No. 60/328,273 filed Oct. 10, 2001, entitled Fly Height Sensor Using Writer Flux.

FIELD OF THE INVENTION

This invention relates generally to the field of magnetic data storage devices, and more particularly, but not by way of limitation, to fly height measurement of a read/write head for a disc drive.

BACKGROUND

Disc drives are used for data storage in modern electronic products ranging from digital cameras to computer systems and networks. A typical disc drive includes a head-disc assembly (HDA) housing the mechanical portion of the drive, and a printed circuit board assembly (PCBA) attached to the head-disc assembly. The printed circuit board assembly controls operations of the head-disc assembly and provides a communication link between the head-disc assembly and a host device served by the disc drive.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface. Disc drives using magneto resistive read/write heads typically use an inductive element, or writer, to write data to the information tracks and a magnetoresistive element, or reader, to read data from the information tracks during drive operations.

One type of data recorded to and read from the information tracks is servo data. Servo data, including a physical track identification portion (also referred to as a servo track number or physical track number), written to the recording surface define each specific physical track of a number of physical tracks written on the recording surface. A servo track writer is traditionally used in writing a predetermined number of servo tracks to each recording surface during the manufacturing process. The servo tracks are used by the closed loop servo system for controlling the position of the read/write head relative to the recording surface during disc drive operations.

High performance disc drives achieve areal bit densities in the range of several gigabits per square centimeter (Gbits/$cm^2$). Higher recording densities can be achieved by increasing the number of bits per centimeter stored along each information track, and/or by increasing the number of tracks per centimeter written across each recording surface. Capacity increases gained through increasing the bits per centimeter stored on each track generally require improvements in the read/write channel electronics to enable data to be written to and subsequently read from the recording surface at a correspondingly higher frequency. Capacity increases gained by increasing the number of tracks per centimeter on each recording surface generally require improvements in servo control systems, which enable the read/write heads to be more precisely positioned relative to the information tracks.

Signal loss in the disc drive is directly proportional to the distance the read/write head is from the information tracks and the wavelength of the signal. As density increases through increased bits per centimeter along the information track, controlling a fly height of the read/write head relative to the information track becomes more demanding. The ability to control the fly height of the read/write head relative to the information track through the mechanical configuration of the disc drive can no longer be depended on to produce disc drives while maintaining high yields in the manufacturing process.

Therefore challenges remain and needs persist for means of measuring the fly height of the read/write head within an assembled disc drive, referred to as an "in-situ" operation, absent the external measurement equipment to provide a basis for fly height control of the read/write head in a disc drive. It is to this and other features and advantages set forth herein that embodiments of the present invention are directed.

SUMMARY OF THE INVENTION

As exemplified by preferred embodiments, the present invention provides for measuring fly height of a read/write head of a data storage device to provide a fly height profile for use in measuring the fly height of the read/write head relative to a rotating recording surface of a disc of the data storage device. With the read/write head adjacent the recording surface, a write signal in the form of a fixed source signal is applied to an inductive element of the read/write head, which results in generation of a magnetic flux field with a stray magnetic flux field portion.

A magnetoresistive element of the read/write head senses the magnetic flux field to produce an initial field strength signal, the amplitude of which is recorded. The read/write head is caused to fly by rotation of the disc, and as the read/write head moves further from the disc, the stray magnetic flux field portion of the magnetic flux field decreases in density, decreasing the amplitude of the field strength signal. The amplitude of the field strength signal is generally inversely proportional to the fly height of the read/write head.

The amplitude of the field strength signal is recorded at predetermined time intervals during takeoff of the read/write head. The amplitude of a final field strength signal is found and recorded when the amplitude of the field strength signal remains constant while the disc rotates at a constant velocity. A field strength profile is determined by taking a difference between the amplitude of the initial field strength signal and the amplitude of each of the field strength signals recorded. Each particular field strength value is related to the time interval of the field strength signal used to determine the particular field strength value to form the field strength profile.

These and various other features and advantages, which characterize the present invention, will be apparent from a reading of the following detailed description and a review of the associated drawings.

BRIEF DESCRIPTION OF THE DRAWINGS

FIG. 2 is a partial cutaway elevational view of the read/write head adjacent a disc of the data storage device of FIG. 1.

FIG. 3 is a partial cutaway elevational view of the read/write head in operational flight relative to the disc of the data storage device of FIG. 1.

FIG. 4 is a circuit diagram of an inductive element of the read/write head of the disc drive of FIG. 1.

FIG. 5 is a circuit diagram of a magnetoresistive element of the read/write head coupled with a preamplifier of the disc drive of FIG. 1.

FIG. 6 is a graphical representation of a field strength value over a predetermined number of emulated altitudes for the read/write head of the disc drive of FIG. 1.

DETAILED DESCRIPTION

Figure 1:
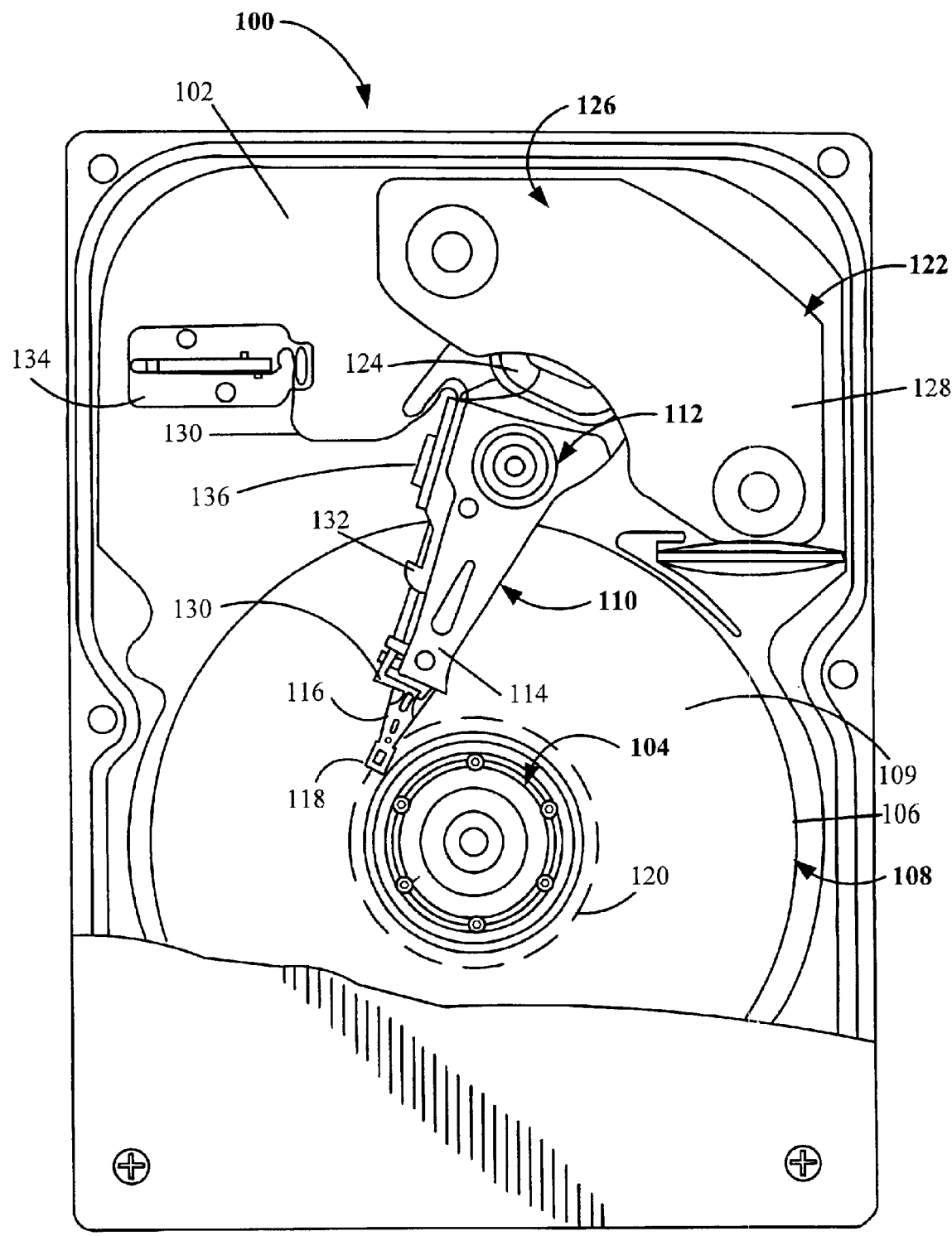
FIG. 1 is a top plan view of a disc drive with a fly height profile based on a fly height measurement of a read/write head to enable fly height control of the read/write head.

Referring to the drawings in general, and more particularly to FIG. 1, shown therein is a top view of a disc drive 100, also referred to herein as a data storage device, constructed in accordance with preferred embodiments of the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The head stack assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 support head position control information written to embedded servo sectors (not separately depicted). Between the embedded servo sectors are data sectors (not depicted) used for storing bit patterns or data. The read/write head 118 includes a reader element (not shown) offset radially and laterally from a writer element (not shown). The writer element writes data to the concentric information tracks 120 during write operations of the disc drive 100, while the reader element controls the positioning of the read/write head 118 relative to the concentric information tracks 120 during read operations of the disc drives 100.

The terms "servoing" and "position-controlling," as used herein, mean maintaining control of the read/write head 118 relative to the rotating recording surfaces 109 during operation of the disc drive 100. Servoing to or on the information track 120, the head stack assembly 110 is controllably positioned by a voice coil motor assembly 122 (also referred to a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the head stack assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA, not shown) mounted to the underside of the basedeck 102. The flex circuit containment channel 132 also supports read/write signal circuitry including preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

FIG. 2 depicts part of a magnetic flux field 137 with a stray magnetic flux field portion 138 produced by an inductive element 140, or writer, of the read/write head 118 when a write current is applied to the inductive element 140. A magnetoresistive element 142, or reader, of the read/write head 118 couples with the magnetic flux field 137, including the stray magnetic flux field portion 138 to generate a signal with an amplitude indicative of the flux density of the total flux field generated by the writer. With the read/write head 118 adjacent the recording surface 109, the stray magnetic flux field portion 138 is at a maximum flux density as indicated by the quantity of flux density lines 143 shown. As the read/write head 118 moves away from the recording surface 109 during takeoff, the flux density of the stray magnetic flux field portion 138 diminishes at nearly a linear rate and reaches a minimum flux density at a maximum fly height of the read/write head 118.

FIG. 3 shows an operational fly height 144 of the read/write head 118 relative to the recording surface 109. The operational fly height 144 is the height that the read/write head 118 flies during operations of the disc drive 100. FIG. 3 also depicts the reduced flux density of the stray magnetic flux field portion 138 that accompanies the operational fly height 144 of the read/write head 118. The diminished number of flux density lines 143 shows the reduced flux density.

FIG. 4 shows a signal 146 applied to a coil 148 of the inductive element 140 of the read/write head 118. The signal 146 is a fixed source signal (either a constant current signal or a constant voltage signal). The fixed source signal 146 generates a substantially constant magnetic flux field 137. This provides the basis for determining fly height of the read/write head 118 relative to the recording surface 109, as only the density of the stray magnetic flux field portion 138 diminishes as the read/write head 118 moves further from the recording surface 109.

FIG. 5 shows a magnetoresistor 150 of the magnetoresistive element 142 connected to the preamplifier 136 and a pair of test nodes 152 used to measure the amplitude of the signal generated by the magnetoresistive element 142 sensing the magnetic flux field 137 with the stray magnetic flux field portion 138. A Hewlett Packard spectrum analyzer, particularly the HP4396A with differential probes, is found to be useful in taking amplitude measurements of the signal generated by the magnetoresistive element 142 over three time frames. The first time frame is while the read/write head 118 is at rest adjacent the recording surface 109 with the magnetic flux field 137 and the stray magnetic flux field portion 138 at a maximum flux density. The second time frame is while the read/write head 118 is taking off from the recording surface 109 during a spin-up cycle and progressing toward the operating fly height 144. While the read/write head 118 is progressing toward the operating fly height 144, i.e., increases in fly height, the flux density of the stray magnetic flux field portion 138 of the magnetic flux field 137 diminishes, causing the signal generated by the magnetoresistor 150 to decrease. The third time frame is while the read/write head 118 is flying at the operational fly height 144. At the operational fly height 144 for the read/write head 118 the flux density of the stray magnetic flux field portion 138 reaches a lowest level for the operating range of the read/write head 118. Also at the operational fly height 144 the signal generated by the magnetoresistor 150 is substantially stable.

Each specific disc drive design has an operating fly height profile unique and specific to it. The operating fly height profile for disc drive 100 is determined by placing the disc drive 100 in a vacuum chamber. The fixed source signal 146 is applied to the coil 148 of the inductive element 140 to generate the stray magnetic flux field portion 138 of the magnetic flux field 137. The amplitude of an initial signal generated by the magnetoresistor 150 as it senses the stray magnetic flux field 138 is recorded. A plurality of predetermined vacuum levels is pulled on the chamber. Each of the predetermined vacuum levels reduces the density of the atmosphere within the disc drive 100 to emulate a particular altitude. As the emulated altitude decreases, the fly height of the read/write head 118 increases and the amplitude of the signal generated by the magnetoresistor 150 decreases. The amplitude of the signal generated by the magnetoresistor 150 is recorded for each of the predetermined vacuum levels.

FIG. 6 shows a line 154 depicting a generally linear relationship between the disc drive 100 operating at a number of the emulated altitudes and a field strength value 156 for those altitudes. For each of the emulated altitudes, a fly height of the read/write head 118 relative to the recording surface 109 is measured and recorded, and the field strength value 156 is determined. The field strength value 156 for each emulated altitude is determined by taking the difference between the amplitude of the initial signal generated by the magnetoresistor 150 as it senses magnetic flux field 137 and the amplitude of the signal generated for each predetermined emulated altitude. The field strength value 156 for each of the emulated altitudes is correlated with the measured fly height of the read/write head 118 relative to the recording surface 109 to provide a predetermined operating fly height profile for the disc drive 100.

Figure 7:
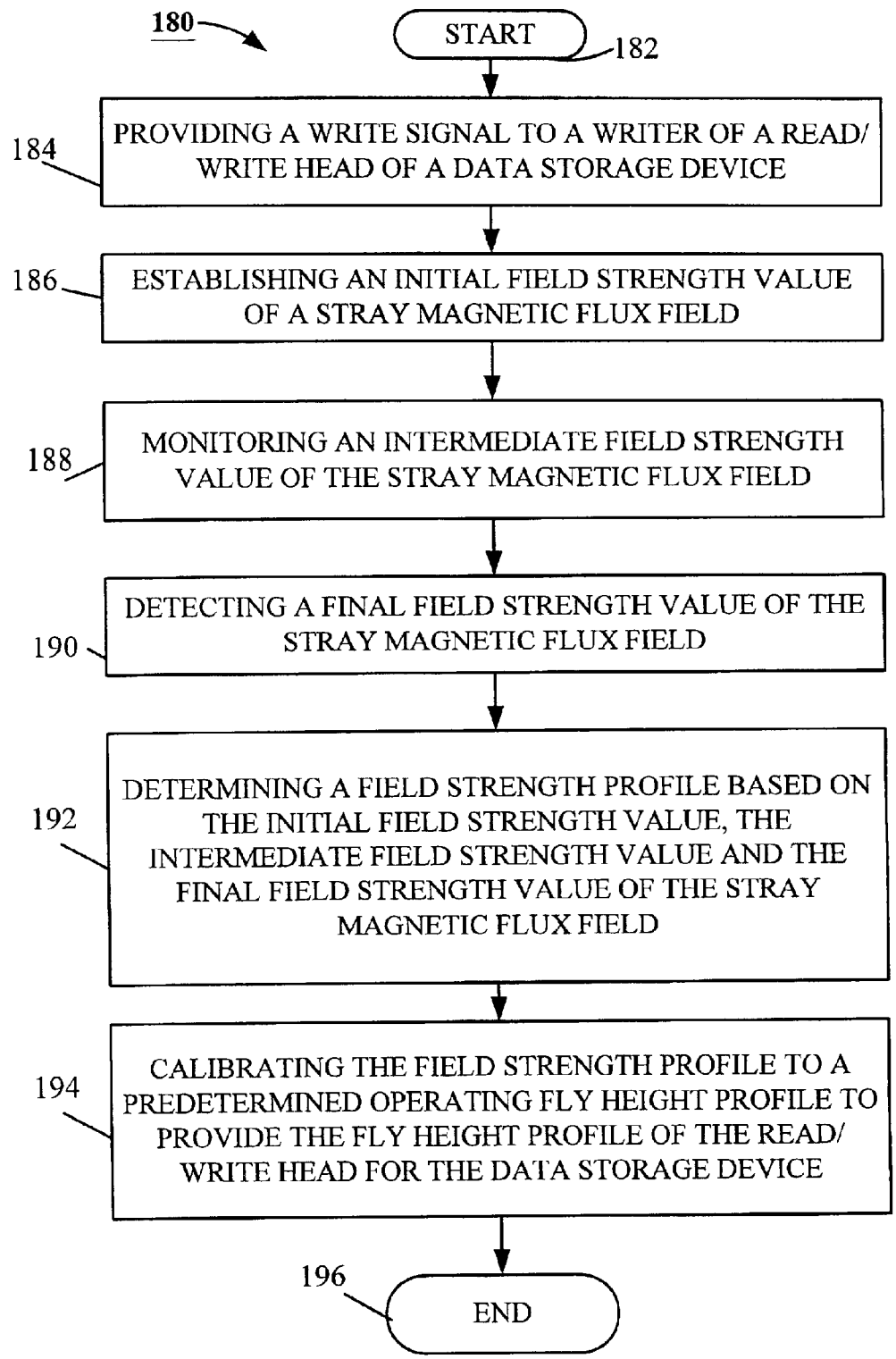
FIG. 7 is a flow chart of a method for measuring the fly height of a read/write head of the disc drive of FIG. 1.

FIG. 7 shows a fly height measurement process 180 for measuring a fly height of a read/write head, such as 118, using a reader, such as 142, coupled to a magnetic flux field, such as 137, which includes a stray magnetic flux field, such as 138, of a writer, such as 140 to provide a signal indicative of the fly height of the read/write head relative to the recording surface. Both the reader and the writer are elements of the read/write head. The fly height of the read/write head is used to provide a fly height profile that enables control of the fly height of the read/write head in a data storage device, such as 100.

The fly height measurement process 180 begins at start step 182 and continues with process step 184. At process step 184, a write signal, such as 146, in the form of a fixed source signal is applied to a coil, such as 148, of the writer, which generates the magnetic flux field including the stray magnetic flux field portion. In process step 186 an initial field strength value of the magnetic flux field is determined by passing the signal generated by the coupling effect of the reader sensing the magnetic flux field to a preamplifier, such as 136, to provide an amplified signal. The amplitude of the amplified signal is measured and serves as the initial field strength value of the stray magnetic flux field portion.

During process step 188, a plurality of intermediate field strength values of the magnetic flux field are monitored, measured and recorded. To measure each of the intermediate field strength values, the recording surface is brought to a constant rotational velocity causing the read/write head to takeoff from the recording surface and attain an operating fly height. While attaining the operating fly height of the read/write head, amplitudes of a plurality of signals generated by the reader that occur over a plurality of predetermined time intervals are measured. The measurements are taken at a pair of test nodes, such as 152, of the preamplifier to provide the plurality of intermediate field strength values.

A final field strength value of the magnetic flux field is found and recorded by determining an absence of a difference between successive amplified signals of the magnetic flux field at process step 190. The absence of a difference between successive amplified signals of the magnetic flux field indicates that the flux density of the stray magnetic flux field portion of the magnetic flux field remained constant between measurements of the amplified signals, i.e., the read/write head attained the operating fly height.

A field strength profile is determined in process step 192 by calculating a change in field strength value for each of the plurality of time intervals. The change in field strength value is the difference between the amplitude of the initial field strength value and the amplitude of subsequent field strength values at the respective time intervals. Then each change in field strength value is correlated with each of the plurality of time intervals to provide the field strength profile.

Process step 194 provides the fly height profile of the read/write head for the data storage device by comparing the field strength profile to a predetermined operating fly height profile. The predetermined operating fly height profile is determined by emulating a predetermined number of altitudes for operating the data storage device and determining a field strength value such as 156 for each emulated altitude. For each of the emulated altitudes, a fly height of the read/write head relative to the recording surface is measured and recorded, and the field strength value is determined. Each field strength value is determined by the difference between an amplitude of an initial signal generated by the magnetoresistor at the lowest emulated altitude, and the amplitude of the signal generated by the magnetoresistor at each of the remaining emulated altitudes. The field strength value for each of the emulated altitudes is correlated with the measured fly height of the read/write head to provide the predetermined operating fly height profile.

The field strength profile is calibrated to the predetermined operating fly height profile by assigning a zero fly height value to the initial field strength value. Then, each remaining field strength value of the field strength profile is selected and compared with the field strength values of the operating fly height profile. If a selected field strength value matches a field strength value of the operating fly height profile, the fly height associated with the field strength value of the operating fly height profile is assigned to the selected field strength value. If the selected field strength value fails to match a field strength value of the operating fly height profile, a fly height is interpolated from the operating fly height profile and assigned to the selected field strength value. The calibration procedure of finding a match or interpolating a value for assignment to each of the selected field strength values is repeated until the entire fly height profile has been formed by matching a fly height with each field strength values.

In an alternate preferred embodiment, an operating fly height equation is determined by placing the data storage device in a vacuum chamber and measuring an amplified signal of the signal generated by the reader as it senses the magnetic flux field to establish an initial field strength value. Then, the data storage device is spun up to a constant rotational velocity and a predetermined number of vacuum levels are pulled on the vacuum chamber to emulate an atmospheric pressure for each of a plurality of predetermined altitudes. Amplitude readings, or field strength values, of the signal generated by the reader as it senses the magnetic flux field are made at each emulated altitude and fly height measurements are made for the read/write head at each emulated altitude. A change in field strength values is determined between each of the field strength values for each of the plurality of emulated altitudes, or operating fly heights, and the initial field strength value, then correlated with the fly height measurements. The relationship defined by the correlation between each change in field strength value for each of the plurality of operating fly heights and each of the measured fly heights of the read/write head for each of the plurality of operating fly heights provides the basis for empirically determining the operating fly height equation. Once this is achieved, the end step 196 concludes the process.

Accordingly, the present invention is directed to a method for measuring a fly height of a read/write head (such as 118) using an amplitude of a signal from a reader (such as 142) coupled to a stray magnetic flux field (such as 138) of a writer (such as 142) to provide a fly height profile to enable a fly height control of the read/write head in a data storage device (such as 100). In accordance with one embodiment, steps of providing a write signal to the writer (such as step 184), establishing an initial field strength value of the stray magnetic flux field (such as step 186), monitoring an intermediate field strength value of the stray magnetic flux field (such as 188), detecting a final field strength value of the stray magnetic flux field (such as step 190), determining a field strength profile based on the initial field strength value, the intermediate field strength value and the final field strength value of the stray magnetic flux field (such as step 192), and calibrating the field strength profile to a predetermined operating fly height profile to provide the fly height profile of the read/write head for the data storage device (such as step 194) are accomplished to determine the fly height profile to enable fly height control of the read/write head in the data storage device.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method comprising:
   imparting a write signal to an inductive element of a read/write head;
   detecting a flux value between the inductive element and a magnetoresistive element of the read/write head, the flux value incident with the write signal; and
   comparing the flux value to a predetermined target value in determining an observed read/write head fly height associated with the flux value.

2. The method of claim 1 wherein the detecting the flux value step comprises detecting an amplitude of a signal from the magnetoresistive element that is incident with the flux value.

3. The method of claim 2 comprising:
   detecting a subsequent flux value between the inductive element and the magnetoresistive element, the subsequent flux value incident with the write signal; and
   comparing the subsequent flux value to the target value in determining an observed fly height associated with the subsequent flux value.

4. The method of claim 3
   wherein the detecting step comprises detecting an amplitude of a subsequent signal from the magnetoresistive element that is incident with the subsequent flux value.

5. The method of claim 4 comprising calculating an observed fly height profile in relation to the flux values.

6. The method of claim 5 wherein the comparing steps comprise comparing the observed fly height profile to the target value.

7. The method of claim 6 wherein the observed fly height profile is calculated from a first datum and a second datum, the first datum comprising an amplitude of a first signal from the magnetoresistive element that is incident with a first flux value associated with a time when the fly height is equal to zero, and the second datum comprising the difference between the amplitude of the first signal and an amplitude of a second signal from the magnetoresistive element that is incident with a second flux value associated with a time when the fly height is not equal to zero.

8. The method of claim 7 comprising:
   detecting one or more intermediate flux values between the inductive element and the magnetoresistive element and incident with the write signal at one or more times between the detecting the first and second flux values and;
   calculating the observed fly height profile in relation to the first, second, and one or more intermediate flux values.

9. The method of claim 8 wherein the target value is characterized by a target fly height profile defining predetermined target flux values associated with different read/write head fly heights.

10. A data storage device comprising:
    a read/write head in a data transfer relationship with a moveable data storage medium, the read/write head comprising a magnetoresistive element for reading data from the medium and an inductive element for writing data to the medium; and
    an in-situ fly height detector circuit detecting a flux value between the inductive element and the magnetoresistive element that is incident with a write signal imparted to the inductive element, and comparing the flux value to a predetermined value in determining an observed read/write head fly height associated with the flux value.

11. The data storage device of claim 10 wherein the circuit detects an amplitude of a signal from the magnetoresistive element that is incident with the flux value.

12. The data storage device of claim 11 wherein the circuit detects a first flux value between the inductive element and the magnetoresistive element that is incident with the write signal and associated with a first read/write head fly height, and detects a second flux value between the inductive element and the magnetoresistive element that is incident with the write signal and associated with a second read/write head fly height, and compares the first and second flux values to the target value in determining first and second observed read/write head fly heights associated respectively with the first and second flux values.

13. The data storage device of claim 12 wherein the circuit calculates an observed fly height profile in relation to the first and second observed read/write head fly heights.

14. The data storage device of claim 13 wherein the circuit compares the observed fly height profile to the target value.

15. The data storage device of claim 14 wherein the circuit calculates the observed fly height profile from a first datum and a second datum, the first datum comprising an amplitude of a first signal from the magnetoresistive element incident with a first flux value associated with a time when the read/write head fly height is zero, and the second datum comprising the difference between the amplitude of the first signal and an amplitude of a second signal from the magnetoresistive element incident with the second flux value associated with a time when the fly height is not equal to zero.

16. The data storage device of claim 15 wherein the circuit detects one or more intermediate flux values between the inductive element and the magnetoresistive element and incident with the write signal at one or more times between detecting the first and second flux values, and calculates the observed fly height profile in relation to the first, second, and one or more intermediate flux values.

17. The data storage device of claim 16 wherein the target value is characterized by a target fly height profile defining predetermined target flux values associated with different read/write head fly heights.

18. A data storage device comprising:
    a read/write head in a data transfer relationship with a moveable data storage medium, the read/write head comprising a read element for reading data from the medium and a write element for writing data to the medium; and
    a fly height detector determining a fly height of the read/write head by steps for an in-situ fly height determination wherein the steps for in-situ fly height determination are characterized by detecting a flux value between the write element and the read element that is incident with a write signal imparted to the write element, and comparing the flux value to a predetermined target value in determining an observed read/write head fly height associated with the flux value.

19. The data storage device of claim 18 wherein the steps for in-situ fly height determination are characterized by detecting an amplitude of a signal from the read element that is incident with the flux value.

20. The data storage device of claim 19 wherein the steps for in-situ fly height determination are characterized by detecting a first flux value between the write element and the read element that is incident with the write signal and associated with a first read/write head fly height, and detecting a second flux value between the write element and the read element that is incident with the write signal and associated with a second read/write head fly height, and comparing the first and second flux values to the target value in determining first and second observed read/write head fly heights associated respectively with the first and second flux values.

21. The data storage device of claim 20 wherein the steps for in-situ fly height determination are characterized by calculating an observed fly height profile in relation to the first and second observed read/write head fly heights.

22. The data storage device of claim 21 wherein the steps for in-situ fly height determination are characterized by calculating the observed fly height profile from a first datum and a second datum, the first datum comprising an amplitude of a first signal from the read element incident with a first flux value associated with a time when the read/write head fly height is zero, and the second datum comprising the difference between the amplitude of the first signal and an amplitude of a second signal from the read element incident with a second flux value associated with a time when the fly height is not equal to zero.

23. The data storage device of claim 22, wherein the steps for in-situ fly height determination are characterized by detecting one or more intermediate flux values between the write element and the read element and incident with the write signal at one or more times between detecting the first and second flux values, and calculating the observed fly height profile in relation to the first, second, and one or more intermediate detected flux values.

* * * * *